FINLEY, HURD & TATEM.
FIRE KINDLER.
No. 117757
Patented Aug 8 1871
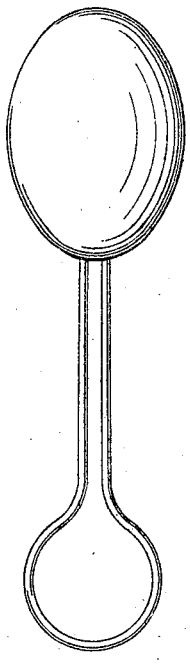
Witnesses:
A. T. Saltmarsh
Gro. Seymour
Inventors:
John E. Finley
George H. Hurd
Benjamin F. Tatem 117,757

UNITED STATES PATENT OFFICE.

JOHN E. FINLEY, GEORGE H. HURD, AND BENJAMIN F. TATEM, OF MEMPHIS, TENNESSEE.

IMPROVEMENT IN FIRE-KINDLERS.

Specification forming part of Letters Patent No. 117,757, dated August 8, 1871.

*To all whom it may concern:*

Be it known that we, JOHN E. FINLEY, GEORGE H. HURD, and BENJAMIN F. TATEM, all of Memphis, county of Shelby and State of Tennessee, have invented a new and Improved Fire-Kindler; and we do hereby declare that the following is a full, clear, and exact description of the construction and operation of the same, reference being made to the accompanying drawing making a part of this specification, in which—

Figure 1 is a perspective view.

D, ball; F, wire handle.

The ingredients entering into the composition of our fire-kindler are composed of clay or fire-clay, four-sixths; pulverized pumice-stone, one-sixth; sawdust or corn meal, one-sixth. These ingredients we mix with water sufficient to make a thick, heavy mortar, suitable for molding. We then mold this composition in the desired shape upon the end of the wire handle F in such a manner as to form the kindler. We then burn the composition in a kiln or furnace until it has become thoroughly hardened, when the fire-kindler is ready for use.

When the kindler is to be used it is saturated with coal-oil or any of the products of petroleum or turpentine, which is readily absorbed by the fire-kindler, it having been rendered porous by the burning of the sawdust or corn meal.

The object of this invention is to furnish a cheap, safe, durable, and convenient fire-kindler by which a fire may be started readily without the use of kindling-wood.

We are aware of the invention of H. K. Horton, dated the 9th of February, 1869. We do not claim, broadly, a fire-kindler with a bulb and handle, as claimed in Horton's invention; but What we do claim is—

A fire-kindler, composed of fire-clay, pumice-stone, sawdust, and corn meal, as and for the purpose described.

JOHN E. FINLEY.
GEO. H. HURD.
BENJAMIN F. TATEM.

Witnesses:
CHS. T. SALTMARSH,
JNO. SEYMOUR.